(12) United States Patent
Xu

(10) Patent No.: US 11,599,646 B2
(45) Date of Patent: Mar. 7, 2023

(54) MEMORY TEST METHOD

(71) Applicant: CHANGXIN MEMORY TECHNOLOGIES, INC., Hefei (CN)

(72) Inventor: Xiaofeng Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/647,997

(22) Filed: Jan. 14, 2022

(65) Prior Publication Data

US 2022/0138318 A1 May 5, 2022

Related U.S. Application Data

(63) Continuation of application No. PCT/CN2021/105582, filed on Jul. 9, 2021.

(30) Foreign Application Priority Data

Oct. 16, 2020 (CN) .......................... 202011111033.5

(51) Int. Cl.
*G06F 21/57* (2013.01)
*G06F 21/79* (2013.01)

(52) U.S. Cl.
CPC ............ *G06F 21/577* (2013.01); *G06F 21/79* (2013.01); *G06F 2221/034* (2013.01)

(58) Field of Classification Search
None
See application file for complete search history.

(56) References Cited

U.S. PATENT DOCUMENTS

| 10,262,717 | B2 | 4/2019 | Fisch et al. |
| 10,665,319 | B1 * | 5/2020 | Levin ..................... G11C 29/38 |
| 2017/0117030 | A1 * | 4/2017 | Fisch .................. G11C 11/4078 |
| 2018/0307434 | A1 | 10/2018 | Bittlestone |
| 2019/0096472 | A1 | 3/2019 | Kang et al. |

(Continued)

FOREIGN PATENT DOCUMENTS

| CN | 107017016 A | 8/2017 |
| CN | 108369820 A | 8/2018 |
| CN | 109559770 A | 4/2019 |

OTHER PUBLICATIONS

International Search Report and English Translation in PCT/CN2021/105582 dated Oct. 9, 2021, 11 pages.

(Continued)

*Primary Examiner* — Fatoumata Traore
(74) *Attorney, Agent, or Firm* — Cooper Legal Group, LLC

(57) ABSTRACT

The present disclosure provides a memory test method. The method includes: determining a refresh cycle T, a designed attack resistance frequency F, and a single row read time t of a target repository; determining an attack row quantity N based on the refresh cycle T, the designed attack resistance frequency F, and the single row read time t; determining a group of target attack rows in the target repository based on a value of the attack row quantity N, where the group of target attack rows include N target attack rows, and at least two of the N target attack rows are spaced apart by one row; detecting, after reading the N target attack rows for X consecutive times, whether data exception occurs in all adjacent rows of the target attack rows, to complete one attack test.

13 Claims, 7 Drawing Sheets

(56) References Cited

U.S. PATENT DOCUMENTS

| | | | |
|---|---|---|---|
| 2019/0198128 A1* | 6/2019 | Fan | G11C 11/4085 |
| 2019/0228813 A1* | 7/2019 | Nale | G11C 11/40611 |
| 2019/0371390 A1* | 12/2019 | Ito | G11C 11/40618 |
| 2021/0398584 A1* | 12/2021 | Devaux | G11C 11/408 |

OTHER PUBLICATIONS

Written Opinion and English Translation cited in PCT/CN2021/105582 dated Oct. 9, 2021, 9 pages.

* cited by examiner

MEMORY TEST METHOD

CROSS-REFERENCE TO RELATED APPLICATIONS

This is a continuation of International Application No. PCT/CN2021/105582, filed on Jul. 9, 2021, which claims the priority to Chinese Patent Application No. 202011111033.5, titled "MEMORY TEST METHOD" and filed with China National Intellectual Property Administration (CNIPA) on Oct. 16, 2020. The entire contents of International Application No. PCT/CN2021/105582 and Chinese Patent Application No. 202011111033.5 are incorporated herein by reference.

TECHNICAL FIELD

The present disclosure relates to, but is not limited to, a memory test method.

BACKGROUND

A row hammer effect means that in a refresh cycle of a dynamic random access memory (DRAM), if memory cells in one row are read multiple times in a short period of time, bit flips occur in memory cells in physically connected adjacent rows, resulting in data exception. Hackers often take advantage of the row hammer effect of memories to make attacks. To prevent the row hammer effect caused by the attacks, the memory manufacturer usually determines through monitoring programs whether a memory is under attack, and then activates active refresh when determining that the memory is under attack, to avoid the row hammer effect.

In order to test whether a protection program of a memory is sufficiently robust, an attack test program needs to be used to perform an attack test on the memory. Different protection programs are set for different memories, and a relatively small quantity of protection programs are set for memories that can be broken through by a method for testing an attack resistance capability of a memory in the related art, resulting in a very high success rate of attack tests. In this case, a memory that passes the test actually may not be capable of resisting a relatively flexible attack policy and cannot definitely resist most improved attack scenarios, that is, reliability verification is insufficient.

It should be noted that information disclosed in the above background section is used merely for a better understanding of the background of the present disclosure, and therefore may include information that does not constitute the prior art known to those of ordinary skill in the art.

SUMMARY

An overview of the subject matter detailed in the present disclosure is provided below, which is not intended to limit the protection scope of the claims.

According to a first aspect of embodiments of the present disclosure, a memory test method is provided, including: determining a refresh cycle T, a designed attack resistance frequency F, and a single row read time t of a target repository; determining an attack row quantity N based on the refresh cycle T, the designed attack resistance frequency F, and the single row read time t; determining a group of target attack rows in the target repository based on a value of the attack row quantity N, wherein the group of target attack rows include N target attack rows, and at least two of the N target attack rows are spaced apart by one row; detecting, after reading the N target attack rows for X consecutive times, whether data exception occurs in all adjacent rows of the target attack rows, to complete one attack test; and completing a plurality of attack tests on the target repository within M refresh cycles, wherein a number of the attack tests is MT/NXt, and when no data exception occurs in all of the attack tests, determining that an attack resistance capability of the target repository meets a requirement.

It should be understood that the above general description and the following detailed description are only exemplary and explanatory, and should not be construed as a limitation to the present disclosure.

Other aspects of the present disclosure are understandable upon reading and understanding the drawings and detailed description.

BRIEF DESCRIPTION OF THE DRAWINGS

The drawings incorporated into the specification and constituting a part of the specification illustrate the embodiments of the present disclosure, and are used together with the description to explain the principles of the embodiments of the present disclosure. In these drawings, similar reference numerals are used to represent similar elements. The drawings in the following description are a part rather than all of the embodiments of the present disclosure. Those skilled in the art may derive other drawings based on these drawings without creative efforts.

One or more embodiments are exemplified by corresponding accompanying drawings, and these exemplified descriptions do not constitute a limitation on the embodiments. Components with the same reference numerals in the accompanying drawings are denoted as similar components, and the accompanying drawings are not limited by scale unless otherwise specified.

DETAILED DESCRIPTION

Figure 1:
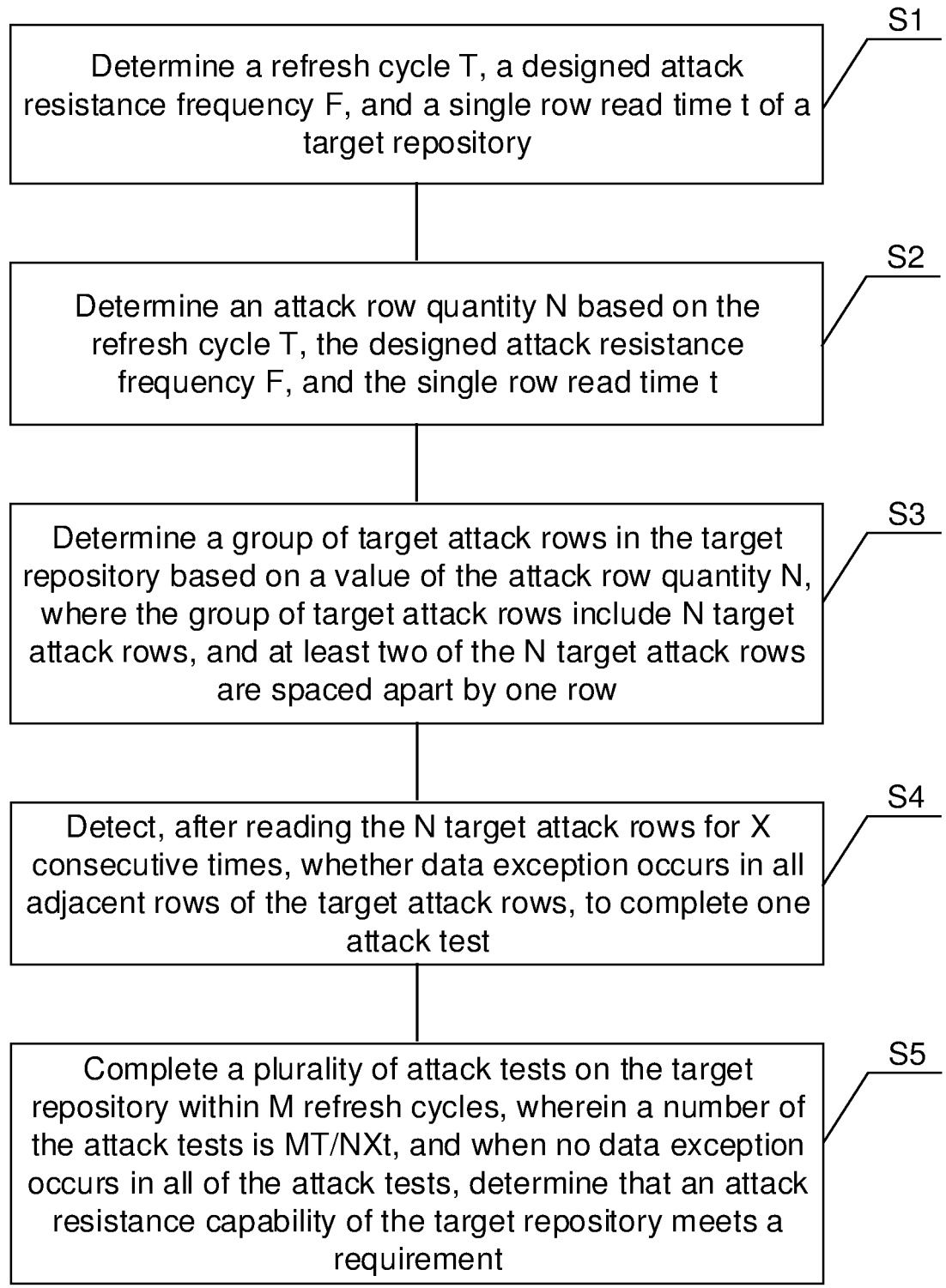
FIG. 1 is a flowchart of a memory test method according to an exemplary embodiment of the present disclosure.

Exemplary implementations are described below more comprehensively with reference to the accompanying drawings. However, the exemplary implementations can be implemented in various forms and should not be construed as being limited to examples described herein. On the contrary, these implementations are provided such that the present disclosure is more comprehensive and complete, and fully conveys the concept of the exemplary implementations to those skilled in the art. The described features, structures, or characteristics may be incorporated into one or more implementations in any suitable manner. In the following description, many specific details are provided to give a full understanding of the implementations of the present disclosure. However, those skilled in the art will be aware that the technical solutions of the present disclosure may be practiced with one or more of the specific details omitted, or other methods, components, apparatuses, steps, and the like may be used. In other cases, the publicly known technical solutions are not illustrated or described in detail, so as to avoid overshadowing and obscuring various aspects of the present disclosure.

In addition, the accompanying drawings are merely schematic diagrams of the present disclosure, and identical reference numerals in the accompanying drawings denote identical or similar parts. Therefore, repeated description thereof will be omitted. Some of the block diagrams shown in the accompanying drawings are functional entities, and do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

The following describes in detail the exemplary implementations of the present disclosure with reference to the accompanying drawings.

FIG. 1 schematically illustrates a flowchart of a memory test method according to an exemplary embodiment of the present disclosure.

Referring to FIG. 1, the memory test method 100 may include:

Step S1. Determine a refresh cycle T, a designed attack resistance frequency F, and a single row read time t of a target repository.

Step S2. Determine an attack row quantity N based on the refresh cycle T, the designed attack resistance frequency F, and the single row read time t.

Step S3. Determine a group of target attack rows in the target repository based on a value of the attack row quantity N, where the group of target attack rows include N target attack rows, and at least two of the N target attack rows are spaced apart by one row.

Step S4. Detect, after reading the N target attack rows for X consecutive times, whether data exception occurs in all adjacent rows of the target attack rows, to complete one attack test.

Step S5. Complete a plurality of attack tests on the target repository within M refresh cycles, wherein a number of the attack tests is MT/NXt, and when no data exception occurs in all of the attack tests, determine that an attack resistance capability of the target repository meets a requirement.

In the embodiments of the present disclosure, an attack solution is determined based on feature values of a memory, such that the memory can be tested at an attack frequency higher than the attack frequency of a designed attack resistance capability of the memory, thereby effectively verifying whether the memory has a row hammer effect attack resistance capability that meets a nominal frequency.

The steps of the memory test method 100 are described below in detail.

In this embodiment of the present disclosure, repositories of a to-be-tested memory are tested one by one. Step S1 to step S5 are steps for testing a repository. The operations in step S1 to step S5 are performed on each repository of the to-be-tested memory, to complete the test of the to-be-tested memory.

In step S1, the refresh cycle T, the designed attack resistance frequency F, and the single row read time t of the target repository are determined.

Generally, the refresh cycle of the memory is set to 64 ms. Between two refreshes, states of a row of memory cells almost do not change autonomously without being operated (there is a small amount of electric leakage). If two adjacent rows (a previous row and a next row) of a target row are read within a short period of time, there is a probability that bit flips occur in memory cells in the target row. In this case, the target row is referred to as having a row hammer effect.

In order to prevent illegal programs from quickly reading a plurality of rows of the memory in close proximity within a short period of time, bit flips are caused to occur in memory cells in one or more rows in the memory by taking advantage of the row hammer effect. When the memory is designed, a protection mechanism is usually adopted, that is, when it is detected that a quantity of read times (that is, a read frequency) of the memory between two refreshes exceeds a preset value, an active refresh is triggered to quickly restore memory cells in which bit flips may occur, to resist attacks. A frequency of attacks that the memory is programed to resist varies. Therefore, for a different memory, a designed attack resistance frequency F thereof needs to be obtained before an attack resistance capability thereof is tested, so as to determine an attack solution in which an attack frequency is greater than F, thereby effectively verifying the attack resistance capability of the memory. In some embodiments, the designed attack resistance frequency F of the memory is 200 k times or 50 k times.

In addition, the single row read time varies with different types of memories, that is, attack time consumption varies. In order to calculate an attack solution with the attack frequency greater than F within the refresh cycle, the single row read time of the memory further needs to be obtained. In an embodiment, the single row read time of the memory is 85 ns.

In step S2, the attack row quantity N is determined based on the refresh cycle T, the designed attack resistance frequency F, and the single row read time t.

In order to implement the attack solution with the frequency greater than F within the refresh cycle, a quantity of rows that can be read per attack needs to be determined first. In an embodiment, the attack row quantity N may be determined according to the following formula:

$$N = [T/Ft] \qquad (1)$$

Formula (1) means rounding a result of T/Ft.

For example, when T=64 ms, F=200 k times, and t=85 ns, in order to complete over 200 k attack tests within 64 ms, an allowable time for each attack test is T/F=64 ms/200 k=320 ns, and a maximum quantity of rows that can be read within the allowable time is 320/85≈3.76. Because only integer rows can be read, the result is rounded to obtain N=3, that is, for the memory, a maximum of 3 rows can be read completely in each attack test.

Similarly, when T=64 ms, F=50 k times, and t=85 ns, in order to complete over 50 k attack tests within 64 ms, an allowable time for each attack test is T/F=64 ms/50 k=1280 ns, and a maximum quantity of rows that can be read within the allowable time is 1280/85≈15.1. Because only integer rows can be read, the result is rounded to obtain N=15, that is, for the memory, a maximum of 15 rows can be read completely in each attack test.

A larger quantity of rows attacked each time indicates a higher probability that a DRAM defense mechanism can be damaged, that is, a higher attack intensity. Therefore, in some embodiments of the present disclosure, the value N determined in formula (1) can be directly used to design an attack solution, to maximize a quantity of target attack rows that can be read in one attack operation, thereby maximizing an attack capability.

In step S3, a group of target attack rows is determined in the target repository based on a value of the attack row quantity N, where the group of target attack rows includes N target attack rows, and at least two of the N target attack rows are spaced apart by one row.

A DRAM protection mechanism is generally probabilistic sampling protection. If only a particular row is attacked, there is a high probability of being detected by the DRAM protection mechanism, resulting in low attack difficulty, and making it impossible to effectively test a true attack resistance capability of a DRAM. Therefore, in this embodiment of the present disclosure, N target attack rows are set, and the N target attack rows are arranged in a plurality of manners, to form a plurality of attack solutions to comprehensively test the attack resistance capability of the DRAM.

In each attack solution, in order to induce a bit flip to occur in at least one memory cell as soon as possible, in this embodiment of the present disclosure, at least two of the target attack rows in the target attack rows are set to be spaced apart by one row, to induce a row hammer effect to occur in a row between the two target attack rows.

An attack solution is determined based on a maximum quantity N of attack rows that can be read in each attack. When the attack row quantity is relatively small, that is, the test frequency is relatively high, a small quantity of attack solutions can be used. In order to improve as much as possible a capability of breaking through a defense solution of the memory, fixed attack rows may be set, that is, several same rows are attacked (read) in each attack test, to increase a possibility of a row hammer effect in adjacent rows of the fixed attack rows. When the attack row quantity is relatively large, that is, the test frequency is relatively low, a quantity of attack times in a single attack test is relatively large. In this case, the row hammer effect may be induced to occur in the memory through a plurality of random reads or cyclic read solutions.

Figure 2:
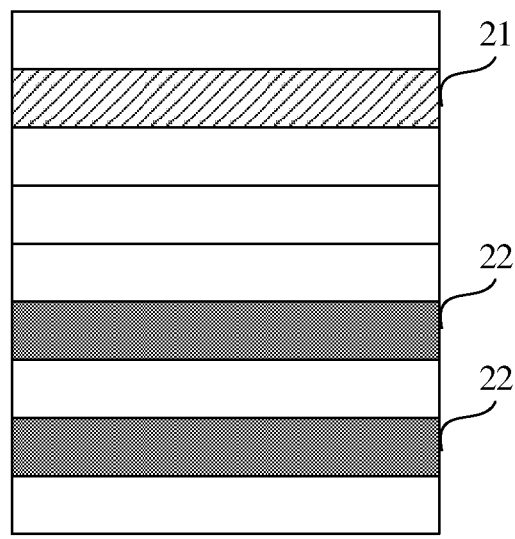
FIG. 2 is a schematic diagram of a group of target attack rows according to an embodiment of the present disclosure.

FIG. 2 is a schematic diagram of a group of target attack rows according to an embodiment of the present disclosure.

Referring to FIG. 2, when the attack row quantity N is less than a preset value, an $i^{th}$ group of target attack rows corresponding to the target repository includes n fixed attack rows and m mobile attack rows, where N=m+n. Row numbers of n fixed attack rows are randomly determined, and row numbers of fixed attack rows are the same in each group of target attack rows corresponding to the target repository. The m mobile attack rows are all spaced apart by one row, a minimum row number of the m mobile attack rows in the $i^{th}$ group of target attack rows is x−1+i, x is a minimum row number of the m mobile attack rows in a first group of target attack rows, and x is randomly determined.

In the embodiment shown in FIG. 2, T=64 ms, F=200 k times, t=85 ns, N=3, n=1, m=2, and the preset value may be, for example, any integer ranging from 3 to 15. The row number of the fixed attack row 21 is randomly determined. Because two mobile attack rows 22 are spaced apart by one row, a row number of only a mobile attack row 22 with the minimum row number needs to be determined. Alternatively, row numbers of the mobile attack rows 22 may be randomly determined.

In order to enhance an attack effect as much as possible and increase a probability that a row hammer effect occurs in adjacent rows of target attack rows, a difference between the row number of the fixed attack row 21 and the row number of the mobile attack row 22 with the minimum row number may be set to a small value, for example, 4.

Figure 3:
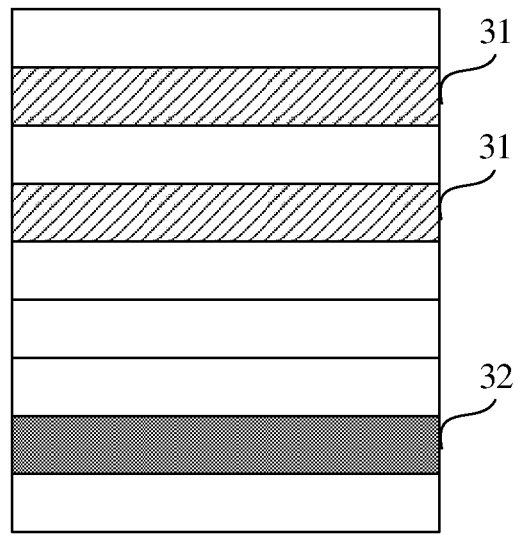
FIG. 3 is a schematic diagram of a group of target attack rows according to another embodiment of the present disclosure.

FIG. 3 is a schematic diagram of a group of target attack rows according to another embodiment of the present disclosure.

Referring to FIG. 3, in another embodiment, when the attack row quantity N is less than a preset value, an $i^{th}$ group of target attack rows corresponding to the target repository includes n fixed attack rows and m mobile attack rows, where N=m+n. The n fixed attack rows are all spaced apart by one row, a minimum row number corresponding to the n fixed attack rows is randomly determined, and row numbers of the n fixed attack rows are the same in each group of target attack rows corresponding to the target repository. Row numbers of the m mobile attack rows are all randomly determined, and the row numbers of the m mobile attack rows are not exactly the same in each group of target attack rows corresponding to the target repository In the embodiment shown in FIG. 3, T=64 ms, F=200 k times, t=85 ns, N=3, n=2, m=1, and the preset value may be, for example, any integer ranging from 3 to 15. Because two fixed attack rows 31 are spaced apart by one row, a row number of only a fixed attack row 31 with the minimum row number needs to be determined. In an embodiment, the row numbers of the fixed attack rows 31 are randomly determined. Alternatively, a row number of the mobile attack row 32 may be randomly determined. In order to enhance an attack effect as much as possible and increase a probability that a row hammer effect occurs in adjacent rows of target attack rows, a difference between the row number of the fixed attack row 31 with the minimum row number and the row number of the mobile attack row 32 may be set to a small value, for example, 6.

Figure 4:
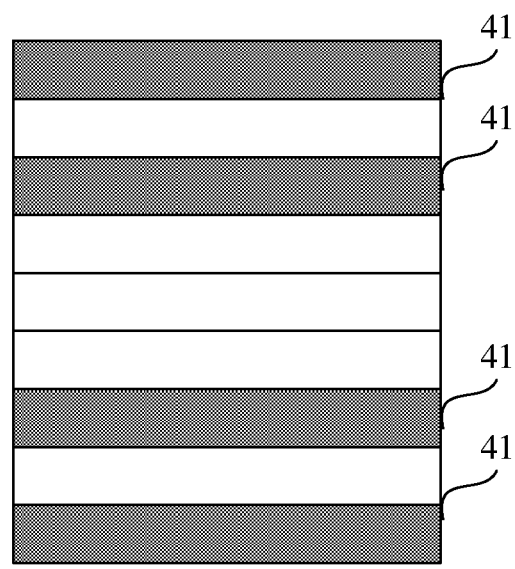
FIG. 4 is a schematic diagram of a group of target attack rows according to still another embodiment of the present disclosure.

FIG. 4 is a schematic diagram of a group of target attack rows according to still another embodiment of the present disclosure.

Referring to FIG. 4, when the attack row quantity N is greater than or equal to a preset value, an $i^{th}$ group of target attack rows corresponding to the target repository includes N mobile attack rows 41, where each mobile attack row and at least one other mobile attack row are spaced apart by one row, a minimum row number of the N mobile attack rows in the $i^{th}$ group of target attack rows is x−1+i, x is a minimum row number of the N mobile attack rows in a first group of target attack rows, and x is randomly determined.

In the embodiment shown in FIG. 4, T=64 ms, F=50 k times, t=85 ns, N=15 (not fully shown), and the preset value may be, for example, any integer ranging from 3 to 15. Because a large quantity of attack rows can be used in a single attack test, attacks can be made through normal reading. However, in order to increase a probability that a row hammer effect occurs in adjacent rows of target attack rows, each mobile attack row may be set to be spaced apart from at least one other attack row by one row, as shown in FIG. 4. A relative position relationship between the mobile attack rows is determined. Therefore, during determining of a group of mobile attack rows, row numbers of the entire group of mobile attack rows can be determined by determining only a row number of a mobile attack row with a minimum row number. In an embodiment, the row number of the mobile attack row with the minimum row number may be randomly determined.

When the attack row quantity N is larger, more attack solutions can be selected. In an embodiment, when N is greater than or equal to the preset value, the value of the attack row quantity N may be updated in response to an attack row quantity modify instruction from a user. That is, the calculated attack row quantity N may be recommended to the user, and when the user intends to increase the attack frequency, the user can decrease the attack row quantity N, and increase the attack frequency by entering a smaller updated value of N. However, because the value of the attack row quantity N in the present disclosure is calculated based on a lowest requirement of satisfying an attack condition (the attack frequency is not less than the designed attack resistance frequency of the to-be-tested memory), if the user increases the value of N, an attack with an attack frequency greater than or equal to the designed attack resistance frequency cannot be achieved. Therefore, in this case, the user is allowed only to decrease the value of N to increase the attack frequency, and is not allowed to increase the value of N to decrease the attack frequency.

Figure 5:
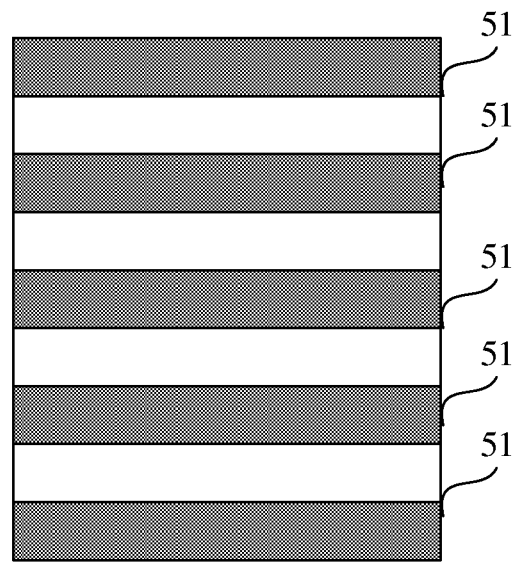
FIG. 5 is a schematic diagram of a group of target attack rows according to still another embodiment of the present disclosure.

FIG. 5 is a schematic diagram of a group of target attack rows according to still another embodiment of the present disclosure.

Referring to FIG. 5, when the attack row quantity N is greater than or equal to a preset value, an $i^{th}$ group of target attack rows corresponding to the target repository includes N mobile attack rows 51. In this case, every two mobile attack rows of the N mobile attack rows may be set to be spaced apart by one row. Compared with those in the embodiment shown in FIG. 4, positions of the mobile attack rows in the embodiment shown in FIG. 5 are set to be more compact, making it easier to induce a row hammer effect to occur in a row between the mobile attack rows.

In Step S4, after the N target attack rows are read for X consecutive times, it is detected whether data exception occurs in all adjacent rows of the target attack rows, to complete one attack test.

After a composition form of a group of target attack rows is determined, mobile attack rows with a same form and changing row numbers can be read in a plurality of attack tests.

For example, for the embodiment shown in FIG. 2, if it is determined that i attack tests are completed within one refresh cycle, a row number of a fixed attack row in a first group of target attack rows corresponding to a first attack test may be randomly determined as z1, the minimum row number of the mobile attack row may be randomly determined as x, the first group of target attack rows are read for X consecutive times, and it is detected whether data exception occurs in all adjacent rows of these target attack rows, to complete one attack test. During a second attack test, a form of a second group of target attack rows is the same as that of the first group, the row number of the fixed attack row is still z1, and the minimum row number of the mobile attack row is x+1. During a third attack test, a row number of a fixed attack row in a third group of target attack rows is still z1, and the minimum row number of the mobile attack row is x+2. By analogy, during an $i^{th}$ attack test, a row number of a fixed attack row in an $i^{th}$ group of target attack rows is still z1, and the minimum row number of the mobile attack row is x−1+i.

During a test in a second refresh cycle, the row numbers of the target attack rows may be redetermined, to provide richer attack solutions. For example, in the embodiment shown in FIG. 2, a row number of a fixed attack row corresponding to a first attack test may be set to z2 and the minimum row number of the mobile attack row may be set to y within the second refresh cycle. According to the above logic, within the second refresh cycle, the row number of the fixed attack row is still z2 and the minimum row number of the mobile attack row is y−1+i during the $i^{th}$ attack test.

Similarly, for the embodiment shown in FIG. 3, within a refresh cycle, a minimum row number of a fixed attack row of a first group of target attack rows may be randomly set to z1 and a row number of a mobile attack row may be randomly set to x during a first attack test, such that during an $i^{th}$ attack test within a same refresh cycle, a minimum row number of a fixed attack row in an $i^{th}$ group of target attack rows is still z1, and a row number of a mobile attack row is x−1+i. Within a second refresh cycle, a minimum row number of a fixed attack row in a first group of target attack rows corresponding to a first attack test is randomly set to z2, and a row number of a mobile attack row is randomly determined as y; and a minimum row number of a fixed attack row in a first group of target attack rows corresponding to an $i^{th}$ attack test is z2, and a row number of a mobile attack row is changed to y−1+i.

For the embodiments shown in FIG. 4 and FIG. 5, when a spacing between mobile attack rows is determined, within a refresh cycle, a minimum row number of a mobile attack row corresponding to a first attack test is x, and a minimum row number of a mobile attack row corresponding to an $i^{th}$ attack test is x−1+i. Within a second refresh cycle, the minimum row number of the mobile attack row is randomly redetermined. The embodiments shown in FIG. 4 and FIG. 5 are applicable to a long-term purely random test.

The row numbers of the mobile attack rows are changed within the refresh cycle, and row numbers of all target attack rows between refresh cycles are changed, such that each attack solution can be fully tested and richer attack solutions can be set.

In step S4, each attack test includes not only a time for normal attacks (reading), but also a time for verifying whether a row hammer effect occurs in adjacent rows. In order to increase an attack frequency, a time occupied by the verification of the row hammer effect needs to be minimized, that is, adjacent rows for verification need to be decreased. In order to increase verification accuracy, the time occupied by the verification of the row hammer effect needs to be maximized. Therefore, a quantity of adjacent rows that need to be verified in one attack test may be set by those skilled in the art according to an actual situation.

In the embodiment shown in FIG. 2, when N=3, a quantity of adjacent rows to be verified is set to 1, and the adjacent row to be verified is a row between two mobile attack rows. In the embodiment shown in FIG. 3, when N=3, the adjacent row to be verified is a row between two fixed attack rows. In the embodiments shown in FIG. 2 and FIG. 3, N=3, 200 k attack operations are performed, and a pure attack time that meets a test requirement is 3*85 ns*200 k=51 ms. Because one refresh cycle is 64 ms, the extra 13 ms in between can be used to set more attack operations and set a quantity of adjacent rows per verification and a quantity of adjacent row operations per verification (that is, set a value of X).

In the embodiment shown in FIG. 4 or FIG. 5, a quantity of attack tests within a refresh cycle, a value of X corresponding to each attack test, and a quantity of adjacent rows to be verified can be set based on the value of N. For example, when N=15, the designed attack resistance frequency is 50 k times, and a pure attack time that meets a test requirement is 15*85 ns*50 k=63.75 ms. Because one refresh cycle is 64 ms, 250 us in one refresh cycle can be used to verify adjacent rows, that is, 250000/85≈2941 adjacent rows can be verified. If 14 adjacent rows (a total quantity of rows between every two target attack rows) need to be verified in one operation of verifying adjacent rows (that is, the end of one attack test), in the attack solution, a maximum of 2941/14≈210 attack tests can be set within one refresh cycle.

The foregoing solution for determining the value of X and the quantity of adjacent rows to be verified in each attack test is merely an example, and those skilled in the art can set those values according to an actual situation.

In step S5, a plurality of attack tests are completed on the target repository within M refresh cycles, wherein a number of the attack tests is MT/NXt, and when no data exception occurs in all of the attack tests, it is determined that an attack resistance capability of the target repository meets a requirement.

As can be learned from the above analysis, one attack test is reading N target attack rows for X times. In this case, a test time of one attack test is at least NXt, and the test time does not include a time for verifying whether a row hammer effect occurs in adjacent rows. That is, a maximum quantity of attack tests can be performed within one refresh cycle T is T/NXt. If the target repository is tested for M refresh cycles, a quantity of attack tests performed on the target repository is MT/NXt.

After attack tests are performed on the target repository for M refresh cycles, if no data exception is found in each attack test, it can be determined that an attack resistance capability of the target repository meets a requirement. If a data exception is found in one attack test, a subsequent attack test may be stopped, and it is directly determined that the attack resistance capability of the target repository does not meet the requirement. Alternatively, if data exception occurs at least a preset value of times (for example, three times) in a plurality of refresh tests, wherein a number of the refresh tests is MT/NXt, it is determined that the attack resistance capability of the target repository does not meet the requirement.

After one target repository is tested, other repositories in the to-be-tested memory are further tested until all repositories of the to-be-tested memory are tested.

Figure 6:
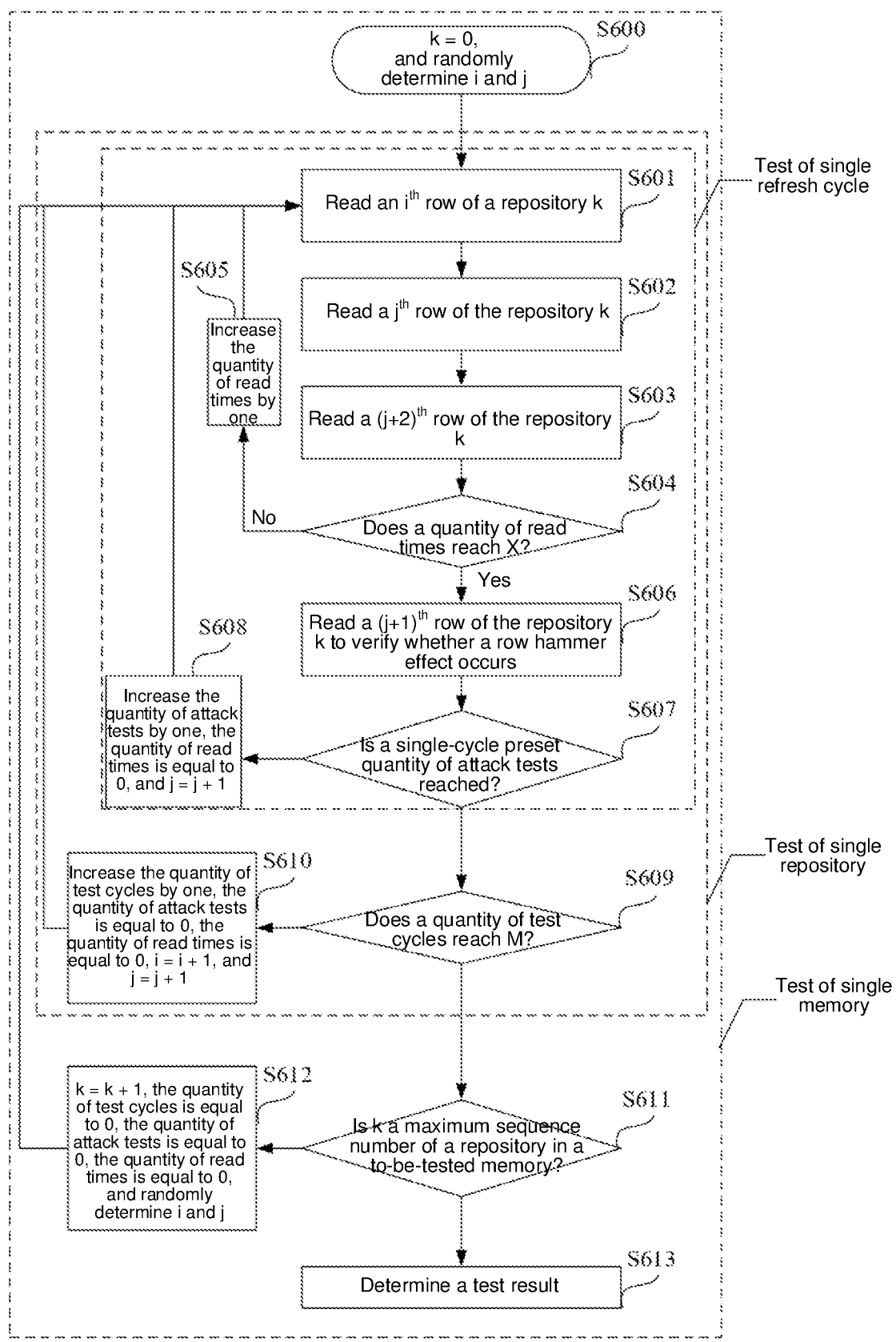
FIG. 6 is a flowchart for testing a to-be-tested memory in the embodiment shown in FIG. 2.

FIG. 6 is a flowchart for testing a to-be-tested memory in the embodiment shown in FIG. 2.

In the embodiment shown in FIG. 6, a test procedure may include:

Step S600. Set a target repository sequence number k to 0, and randomly determine a row number i of a fixed attack row and a minimum row number j of a mobile attack row according to step S1 to step S3.

Step S601. Read an $i_{th}$ row of the repository k.

Step S602. Read a $j^{th}$ row of the repository k.

Step S603. Read a $(j+2)^{th}$ row of the repository k.

Step S604. Determine whether a sequence number read in the current round, that is, a quantity of read times, reaches X, and if no, proceed to step S605, or if yes, proceed to step S606.

Step S605. Increase the quantity of read times by one and return to step S601.

Step S606. Read a $(j+1)^{th}$ row of the repository k to verify whether a row hammer effect occurs.

Step S607. Determine whether a single-cycle preset quantity of attack tests is reached, and if no, proceed to step S608, or if yes, proceed to step S609.

Step S608. Increase the quantity of attack tests by one, reset the quantity of read times, increase j by one, and then return to step S601.

Step S609. Determine whether a quantity of test cycles reaches M, and if no, proceed to step S610, or if yes, proceed to step S611.

Step S610. Increase each of the quantity of test cycles, i, and j by one, reset the quantity of attack tests and the quantity of read times, and then return to step S601.

Step S611. Determine whether k is a maximum sequence number of a repository in a to-be-tested memory, and if no, proceed to step S612, or if yes, proceed to step S613.

Step S612. Reset the quantity of test cycles, the quantity of attack tests, and the quantity of read times, increase k by one, randomly redetermine i and j, and then return to step S601.

Step S613. Determine a test result.

In the embodiment shown in FIG. 6, steps S601 to S606 are a test procedure of a single attack test, steps S601 to S608 are a test procedure of a single refresh cycle, steps S601 to S610 are a test procedure of a single repository, and steps S600 to S613 are a test procedure of a single memory.

Figure 7:
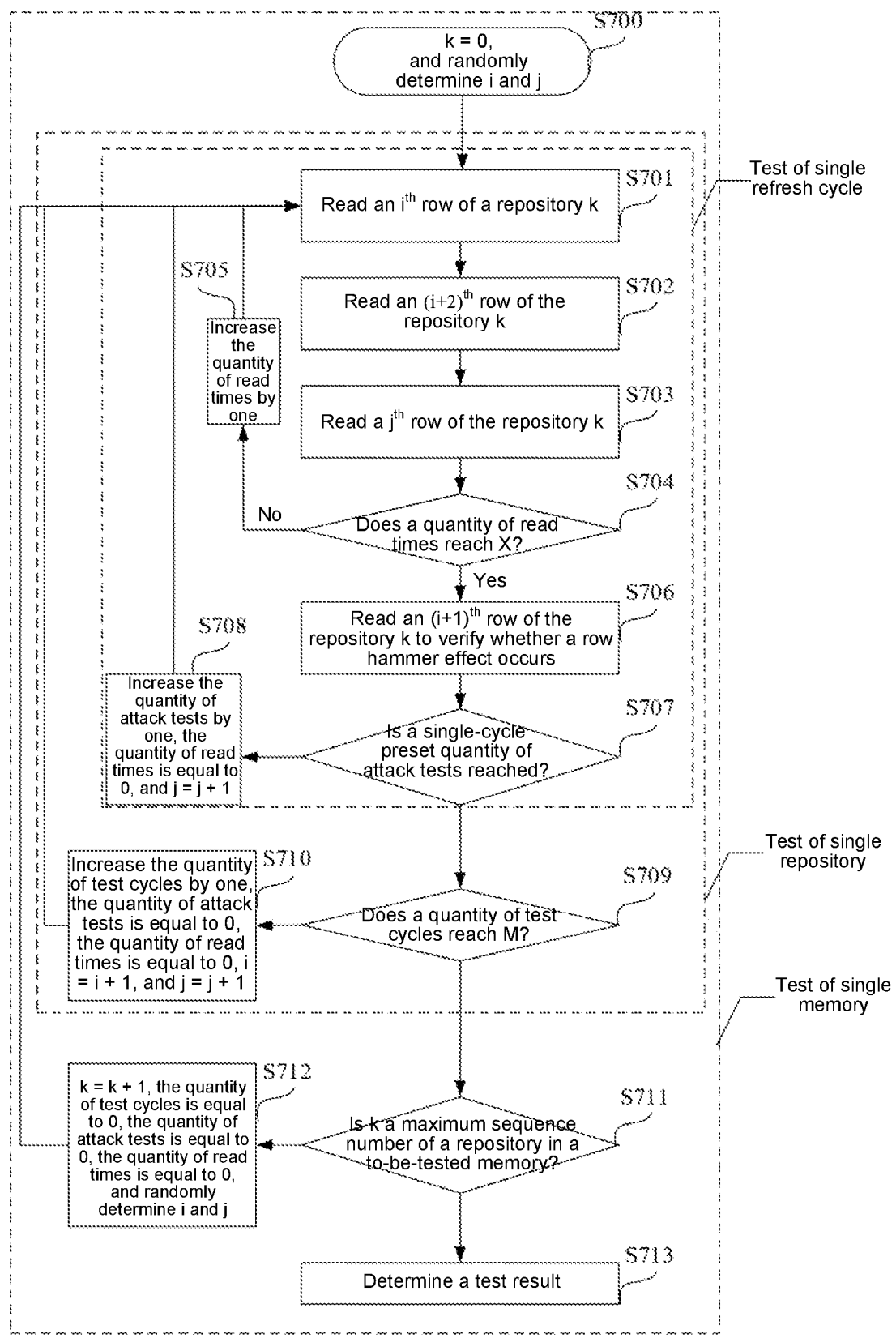
FIG. 7 is a flowchart for testing a to-be-tested memory in the embodiment shown in FIG. 3.

FIG. 7 is a flowchart for testing a to-be-tested memory in the embodiment shown in FIG. 3.

In the embodiment shown in FIG. 7, a test procedure may include:

Step S700. Set a target repository sequence number k to 0, and randomly determine a minimum row number i of a fixed attack row and a row number j of a mobile attack row according to step S1 to step S3.

Step S701. Read an $i^{th}$ row of the repository k.

Step S702. Read an $(i+2)^{th}$ row of the repository k.

Step S703. Read a $j^{th}$ row of the repository k.

Step S704. Determine whether a sequence number read in the current round, that is, a quantity of read times, reaches X, and if no, proceed to step S705, or if yes, proceed to step S706.

Step S705. Increase the quantity of read times by one and return to step S701.

Step S706. Read an $(i+1)^{th}$ row of the repository k to verify whether a row hammer effect occurs.

Step S707. Determine whether a single-cycle preset quantity of attack tests is reached, and if no, proceed to step S708, or if yes, proceed to step S709.

Step S708. Increase the quantity of attack tests by one, reset the quantity of reading times, increase j by one, and then return to step S701.

Step S709. Determine whether a quantity of test cycles reaches M, and if no, proceed to step S710, or if yes, proceed to step S711.

Step S710. Increase each of the quantity of test cycles, i, and j by one, reset the quantity of attack tests and the quantity of read times, and then return to step S701.

Step S711. Determine whether k is a maximum sequence number of a repository in a to-be-tested memory, and if no, proceed to step S712, or if yes, proceed to step S713.

Step S712. Reset the quantity of test cycles, the quantity of attack tests, and the quantity of read times, increase k by one, randomly redetermine i and j, and then return to step S701.

Step S713. Determine a test result.

In the embodiment shown in FIG. 7, steps S701 to S706 are a test procedure of a single attack test, steps S701 to S708 are a test procedure of a single refresh cycle, steps S701 to S710 are a test procedure of a single repository, and steps S700 to S713 are a test procedure of a single memory.

Figure 8:
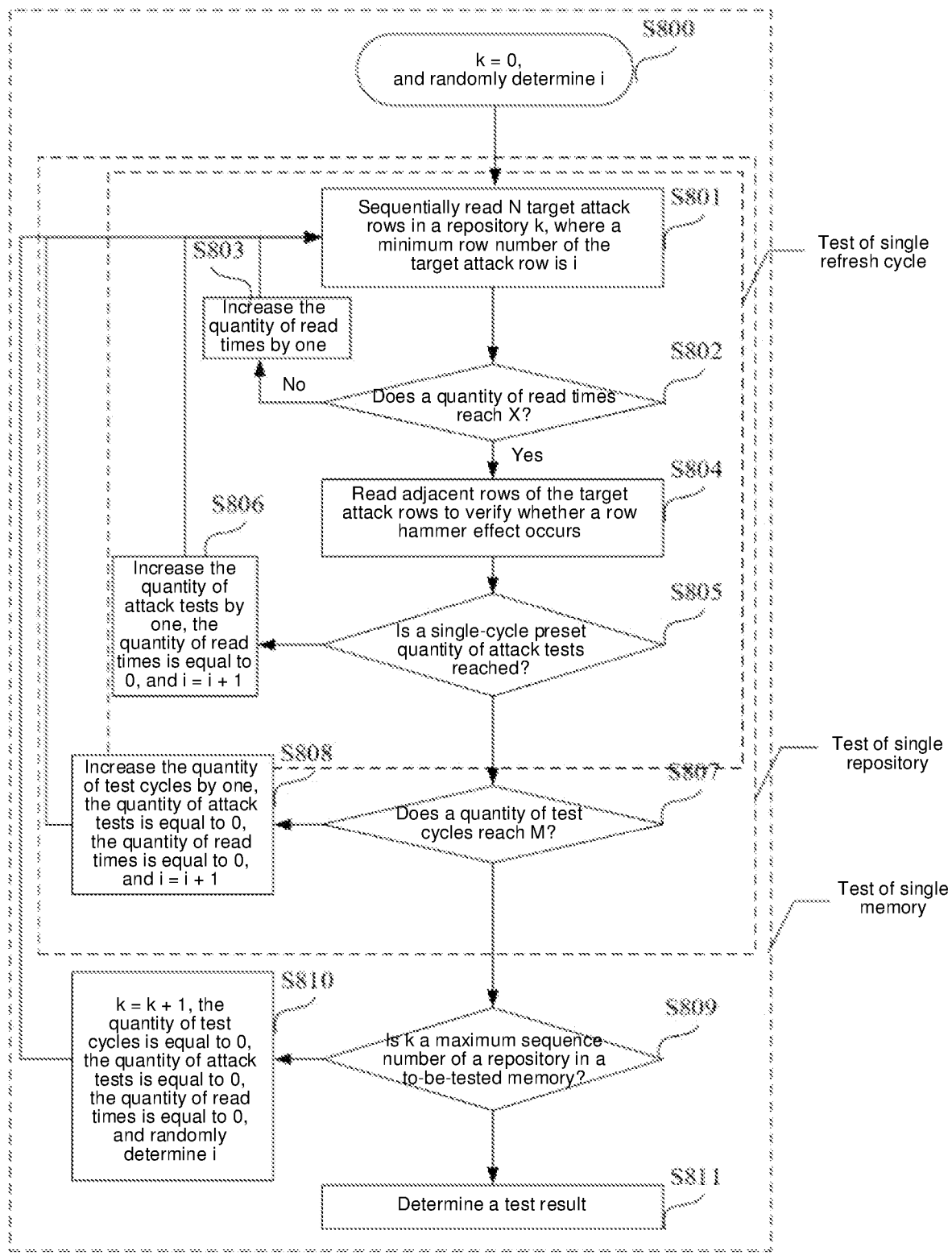
FIG. 8 is a flowchart for testing a to-be-tested memory in the embodiment shown in FIG. 4 or FIG. 5.

FIG. 8 is a flowchart for testing a to-be-tested memory in the embodiment shown in FIG. 4 or FIG. 5.

In the embodiment shown in FIG. 8, a test procedure may include:

Step S800. Set a target repository sequence number k to 0, and randomly determine a minimum row number i of a mobile attack row according to step S1 to step S3.

Step S801. Sequentially read N target attack rows in the repository k, where a minimum row number of the target attack row is i.

Step S802. Determine whether a sequence number read in the current round, that is, a quantity of read times, reaches X, and if no, proceed to step S803, or if yes, proceed to step S804.

Step S803. Increase the quantity of read times by one and return to step S801.

Step S804. Read adjacent rows of the target attack rows to verify whether a row hammer effect occurs.

Step S805. Determine whether a single-cycle preset quantity of attack tests is reached, and if no, proceed to step S806, or if yes, proceed to step S807.

Step S806. Increase the quantity of attack tests by one, reset the quantity of reading times, increase j by one, and then return to step S801.

Step S807. Determine whether a quantity of test cycles reaches M, and if no, proceed to step S808, or if yes, proceed to step S809.

Step S808. Increase each of the quantity of test cycles and i by one, reset the quantity of attack tests and the quantity of read times, and then return to step S801.

Step S809. Determine whether k is a maximum sequence number of a repository in a to-be-tested memory, and if no, proceed to step S810, or if yes, proceed to step S811.

Step S810. Reset the quantity of test cycles, the quantity of attack tests, and the quantity of read times, increase k by one, randomly redetermine i, and then return to step S801.

Step S811. Determine a test result.

In the embodiment shown in FIG. 8, steps S801 to S804 are a test procedure of a single attack test, steps S801 to S806 are a test procedure of a single refresh cycle, steps S801 to S808 are a test procedure of a single repository, and steps S800 to S811 are a test procedure of a single memory.

Effectiveness of the method in the embodiments of the present disclosure has been verified in a test of attacking an Intel coffee lake 9th processor. A memory protection mechanism of Coffee Lake is broken through by directly accessing a memory through cache off access. A row hammer effect is induced in the memory by the attack solutions corresponding to the embodiments.

The embodiments of the present disclosure can be implemented based on an extensible firmware interface (EFI) environment to bypass addressing defects and memory fragmentation defects existing in an operating system (OS) environment. The EFI environment is an upgrade solution introduced by Intel to replace Basic Input/Output System (BIOS) in future PC-like computer systems.

EFI is conceptually similar to a low-level operating system, is an interface specification between hardware and pre-boot software, and has a capability to control all hardware resources. Providing no complex memory protection functions, the EFI environment has only a simple memory management mechanism. Specifically, it means running in a segment protection mode of an x86 processor to divide a memory into a flat segment within a maximum addressing capability. All programs have permission to access any segment location, no real protection service is provided. After all components of EFI are loaded, the system can enable a command interpretation environment similar to an operating system Shell, where a user can call in and execute any EFI application.

The method provided in the embodiments of the present disclosure can be implemented in a form of an EFI application, to directly test the memory.

Figure 9:
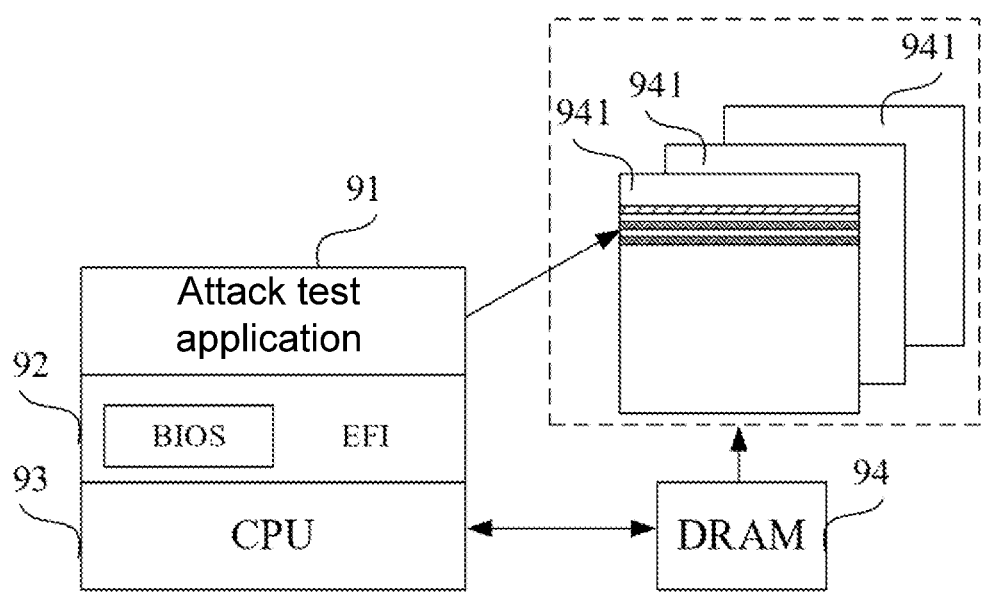
FIG. 9 is a schematic diagram of an implementation environment according an embodiment of the present disclosure.

FIG. 9 is a schematic diagram of an implementation environment according an embodiment of the present disclosure.

Referring to FIG. 9, an attack test application 91 is set on an EFI environment 92, and the EFI environment 92 is based on a CPU 93 and is provided with a BIOS function. The CPU 93 is connected to a DRAM 94, and the DRAM 94 includes a plurality of repositories 941. The attack test application 91 executes the method shown in FIG. 1 to read rows in the repositories 941, to test an attack resistance capability of the DRAM 94.

The method provided in the embodiments of the present disclosure may be alternatively implemented in other manners. This is not specially limited in the present disclosure.

In summary, in the embodiments of the present disclosure, a plurality of attack solutions are determined based on parameters of the DRAM, such that strength of attacking the DRAM using the row hammer effect can be effectively increased, thereby making a test result of a DRAM attack resistance capability test more accurate.

The foregoing accompanying drawings are merely schematic illustrations of the processing included in the method according to the exemplary embodiments of the present disclosure, and are not intended for limitation. It is easily understood that the processes shown in the foregoing accompanying drawings does not indicate or limit a chronological sequence of these processes. In addition, it is also easily understood that these processes can be performed synchronously or asynchronously, for example, in a plurality of modules.

Those skilled in the art may easily figure out other implementations of the present disclosure after considering the specification and practicing the content disclosed herein. The present disclosure is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and concept of the present disclosure are specified by the appended claims.

Finally, it should be noted that the above embodiments are merely intended to explain the technical solutions of the present disclosure, rather than to limit the present disclosure. Although the present disclosure is described in detail with reference to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

In the memory test method provided in the embodiments of the present disclosure, an attack solution is determined based on feature values of a memory, such that an attack test can be performed on the memory at an attack frequency higher than the attack frequency of a designed attack resistance capability of the memory, thereby effectively verifying whether the memory has a row hammer effect attack resistance capability that meets a nominal frequency.

The invention claimed is:

1. A memory test method, comprising:
  determining a refresh cycle T, a designed attack resistance frequency F, and a single row read time t of a target repository associated with dynamic random access memory (DRAM);
  determining an attack row quantity N based on the refresh cycle T, the designed attack resistance frequency F, and the single row read time t;
  determining a group of target attack rows in the target repository based on a value of the attack row quantity N, wherein the group of target attack rows include N target attack rows, and at least two of the N target attack rows are spaced apart by one row;
  detecting, by a processor after reading the N target attack rows for X consecutive times, whether data exception occurs in all adjacent rows of the target attack rows, to complete one attack test; and
  completing, by the processor, a plurality of attack tests on the target repository within M refresh cycles, wherein a number of the attack tests is MT/NXt, and when no data exception occurs in all of the attack tests, determining that an attack resistance capability of the target repository meets a requirement.

2. The memory test method according to claim 1, wherein the determining an attack row quantity N based on the refresh cycle T, the designed attack resistance frequency F, and the single row read time t comprises: N=[T/Ft].

3. The memory test method according to claim 1, wherein the determining a group of target attack rows in the target repository based on a value of the attack row quantity N comprises:
  when the attack row quantity N is less than a preset value, determining that an $i^{th}$ group of target attack rows corresponding to the target repository include n fixed attack rows and m mobile attack rows, wherein N=m+n;
  row numbers of the n fixed attack rows are randomly determined, and row numbers of the fixed attack rows are the same in each group of target attack rows corresponding to the target repository; and the m mobile attack rows are all spaced apart by one row, a minimum row number of the m mobile attack rows in the $i^{th}$ group of target attack rows is x−1+i, x is a minimum row number of the m mobile attack rows in a first group of target attack rows, and x is randomly determined.

4. The memory test method according to claim 1, wherein the determining a group of target attack rows in the target repository based on a value of the attack row quantity N comprises:
  when the attack row quantity N is less than a preset value, determining that an $i^{th}$ group of target attack rows corresponding to the target repository include n fixed attack rows and m mobile attack rows, wherein N=m+n,
  the n fixed attack rows are all spaced apart by one row, a minimum row number corresponding to the n fixed attack rows is randomly determined, and row numbers of the n fixed attack rows are the same in each group of target attack rows corresponding to the target repository; and row numbers of the m mobile attack rows are all randomly determined, and the row numbers of the m mobile attack rows are not exactly the same in each group of target attack rows corresponding to the target repository.

5. The memory test method according to claim 1, wherein the determining a group of target attack rows in the target repository based on a value of the attack row quantity N comprises:
  when the attack row quantity N is greater than or equal to a preset value, determining that an $i^{th}$ group of target attack rows corresponding to the target repository include N mobile attack rows, wherein each mobile attack row and at least one other mobile attack row are spaced apart by one row, a minimum row number of the N mobile attack rows in the $i^{th}$ group of target attack rows is x−1+i, x is a minimum row number of the N mobile attack rows in a first group of target attack rows, and x is randomly determined.

6. The memory test method according to claim 5, wherein every two mobile attack rows of the N mobile attack rows are spaced apart by one row.

7. The memory test method according to claim 3, wherein N=3, n=1, and m=2.

8. The memory test method according to claim 4, wherein N=3, n=2, and m=1.

9. The memory test method according to claim 5, wherein N=15.

10. The memory test method according to claim 5, wherein the memory test method further comprises:
  when the attack row quantity N is greater than or equal to the preset value, updating the value of the attack row quantity N in response to an attack row quantity modification instruction from a user.

11. The memory test method according to claim 1, wherein the method is implemented based on an extensible firmware interface environment.

12. The memory test method according to claim 6, wherein N=15.

13. The memory test method according to claim 6, wherein the memory test method further comprises:
  when the attack row quantity N is greater than or equal to the preset value, updating the value of the attack row quantity N in response to an attack row quantity modification instruction from a user.

* * * * *